United States Patent
Wollants et al.

(10) Patent No.: US 9,163,544 B2
(45) Date of Patent: Oct. 20, 2015

(54) UNIT FOR RECOVERING THERMAL ENERGY FROM EXHAUST GAS OF AN INTERNAL COMBUSTION ENGINE

(71) Applicant: Scambia Holdings Cyprus Limited, Limassol (CY)

(72) Inventors: Freddy Wollants, Aarschot (BE); Jean-Paul Hubert Janssens, Leopoldsburg (BE)

(73) Assignee: Bosal Emission Control Systems N.V., Lummen (BE)

( * ) Notice: Subject to any disclaimer, the term of this patent is extended or adjusted under 35 U.S.C. 154(b) by 0 days.

(21) Appl. No.: 14/276,259

(22) Filed: May 13, 2014

(65) Prior Publication Data
US 2014/0338313 A1    Nov. 20, 2014

(30) Foreign Application Priority Data

May 14, 2013    (EP) .............................. EPC13167675

(51) Int. Cl.
*F01N 3/02*    (2006.01)
*F01N 5/02*    (2006.01)
*F02G 5/02*    (2006.01)

(52) U.S. Cl.
CPC .. *F01N 5/02* (2013.01); *F02G 5/02* (2013.01); *F01N 2240/02* (2013.01); *F01N 2240/20* (2013.01); *F01N 2240/36* (2013.01); *F01N 2410/00* (2013.01); *Y02T 10/16* (2013.01); *Y02T 10/166* (2013.01)

(58) Field of Classification Search
CPC ... F01N 5/02; F01N 2240/02; F01N 2240/36; F01N 2410/00; F01N 2240/20; F02G 5/02

USPC .......................................................... 60/320
See application file for complete search history.

(56) References Cited

U.S. PATENT DOCUMENTS

| 6,141,961 | A | 11/2000 | Rinckel | |
|---|---|---|---|---|
| 2004/0251012 | A1 | 12/2004 | Bush et al. | |
| 2008/0202735 | A1* | 8/2008 | Geskes et al. ................. | 165/166 |
| 2008/0251242 | A1* | 10/2008 | Irmler et al. .................. | 165/164 |
| 2009/0044525 | A1 | 2/2009 | Husges et al. | |
| 2009/0164097 | A1* | 6/2009 | Uda .............................. | 701/103 |
| 2012/0017575 | A1 | 1/2012 | Sloss | |
| 2012/0102934 | A1* | 5/2012 | Magnetto ......................... | 60/320 |
| 2012/0222838 | A1* | 9/2012 | Hisanaga et al. ............... | 165/96 |

FOREIGN PATENT DOCUMENTS

EP    2381083    10/2011

OTHER PUBLICATIONS

European Search Report for EP application No. 13167675 mailed Oct. 23, 2013 (6 pages).

* cited by examiner

*Primary Examiner* — Jason Shanske

(74) *Attorney, Agent, or Firm* — Merchant & Gould P.C.

(57) ABSTRACT

A unit for recovering thermal energy from exhaust gas of an internal combustion engine including an inlet, an outlet, a heat exchanger arranged downstream of the inlet and upstream of the outlet, and a valve capable of being switched between a recovery position. The exhaust gas flows from the inlet through the heat exchanger to the outlet, and a bypass position, in which the exhaust gas flows from the inlet through a bypass to the outlet. The valve includes separate first and second valve bodies and associated separate first and second valve seats arranged upstream and downstream of the heat exchanger, respectively. The first and second valve bodies are adapted to be switched only simultaneously from the recovery position to the bypass position and vice versa.

8 Claims, 7 Drawing Sheets

UNIT FOR RECOVERING THERMAL ENERGY FROM EXHAUST GAS OF AN INTERNAL COMBUSTION ENGINE

CROSS-REFERENCE TO RELATED APPLICATION

This application claims the priority benefit of European Patent Application No. 13167675.1, filed on May 14, 2013, which is hereby incorporated herein by reference.

TECHNICAL FIELD

The present invention relates to a unit for recovering thermal energy in accordance with the independent claim.

BACKGROUND

The automotive industry is more and more oriented in the design of engines, on-board systems and the vehicle itself, towards the reduction of fuel consumption, emission of pollutants, recyclability of materials and the recovery and conversion of thermal energy that would otherwise be dissipated.

As regards the recovery and conversion of thermal energy, the exhaust gas exiting from the internal combustion engine carries, after being treated by a catalyst or by an even more complex treatment unit, an amount of thermal energy that can be recovered for various useful purposes. For example, it has been suggested to recover the thermal energy from the exhaust gas for the purpose of heating the cabin (by more rapidly heating up the cooling water of the engine) of the vehicle, for the purpose more rapidly heating up the lubricating oil to the optimum temperature (lower viscosity) after a cold start of the engine, or for converting the thermal energy into electrical energy (with the aid of a suitable converter).

Such unit for recovering thermal energy is known, for example, from EP-A-2 381 083. The unit disclosed in this reference comprises an inlet for the exhaust gas, an outlet for the exhaust gas, and a heat exchanger arranged between the inlet and the outlet for the exhaust gas. In addition, the unit comprises a single rotatable valve flap that can be rotated to a recovery position in which the exhaust gas is directed along a U-shaped path through the heat exchanger while exhaust gas is prevented from flowing through the bypass. Alternatively, the valve flap can be rotated to a bypass position in which the exhaust gas is directed along a straight bypass of the heat exchanger, although the U-shaped flow path through the heat exchanger is not physically closed. As a further alternative, the valve flap can be rotated to any angular position between the recovery position and the bypass position for partial heat recovery.

However, the unit disclosed in EP-A-2 381 083 suffers from a number of disadvantages. First of all, the single valve flap may only substantially completely close the bypass even when the valve flap is in the recovery position, since the valve flap must be capable of being rotated to a desired position at any operating condition (e.g. after a cold start of the engine as well as when the engine is at the desired operating temperature, at which the inner diameter of the bypass may be larger than after a cold start due to the change in temperature). Accordingly, at least some clearance must be provided between the valve flap and the inner wall of the bypass so that the valve flap cannot completely close the bypass even when the valve flap is in the recovery position (bypass closed). As a consequence of this clearance, there is some backflow of exhaust gas that—after having flown through the heat exchanger—has been cooled to a temperature which is considerably lower than that of the exhaust gas coming from the engine or the catalyst and entering the unit. This leads to a loss of heat of the exhaust gas flowing through the heat exchanger which is unwanted and reduces the efficiency of the heat recovery process. Also, as the valve is in the recovery position the valve flap is rotated to a position in which it is arranged perpendicular to the direction flow of exhaust gas through the bypass. This may generate an unwanted backpressure which must be overcome thus reducing the efficiency of the engine.

As the valve is in the bypass position the U-shaped flow path through the heat exchanger is not completely closed, although any further heating up of the cooling water of the engine (which is the working fluid flowing through the heat exchanger) may be unwanted since the cooling water already has the desired temperature. Needless to say that in any position between the recovery position and the bypass position there may be backflow of exhaust gas which has been cooled—after having flown through the heat exchanger—to a temperature which is considerably lower than the temperature of the exhaust gas entering the system, thus substantially reducing the efficiency of the heat recovery process.

SUMMARY

The present invention suggests a unit for recovering thermal energy from exhaust gas of an internal combustion engine as it is specified by the features of the independent claim. Advantageous aspects of the unit according to the invention are the subject of the dependent claims.

In particular, the unit for recovering thermal energy from exhaust gas of an internal combustion engine according to the invention comprises:

an inlet for the exhaust gas to enter the unit;
an outlet for the exhaust gas to exit the unit;
a heat exchanger in fluid communication with the inlet and the outlet, said heat exchanger being arranged downstream of the inlet and upstream of the outlet with respect to the flow of the exhaust gas through the unit; and
a valve capable of being switched between a recovery position, in which the exhaust gas is directed to flow from the inlet through the heat exchanger to the outlet, and a bypass position, in which the exhaust gas is directed to flow from the inlet through a bypass to the outlet. The valve comprises separate first and second valve bodies and associated separate first and second valve seats for receiving the separate first and second valve bodies in the recovery position and in the bypass position. The first valve body and the associated first valve seat are arranged upstream of the heat exchanger and the bypass, respectively, with respect to the flow of the exhaust gas through the unit. The second valve body and the associated second valve seat are arranged downstream of the heat exchanger and the bypass, respectively. The first and second valve bodies are adapted to be switched only simultaneously from the recovery position to the bypass position and vice versa.

The unit according to the invention is advantageous in some aspects which are discussed in the following, without this discussion being exhaustive. Due to the valve comprising two valve bodies which are capable of being switched only simultaneously between the recovery position and the bypass position, it is possible that either the bypass is fully closed (recovery position of the valve bodies) so that all of the exhaust gas flows through the heat exchanger only, or that the path through the heat exchanger is fully closed (bypass position of the valve bodies) so that all of the exhaust gas flows through the bypass. Accordingly, any unwanted backflow of exhaust gas is completely eliminated so that no parasitic heat loss occurs, thus providing for an increased efficiency of the recovery process. Also, the unit according to the invention can be a very compact space-saving unit from a constructional point of view. This is important since the space available in the engine compartment of the vehicle is quite limited thus setting considerable restrictions related to the size and arrangement of the components. Also, the housing of the unit is small and can be light-weight and simple in construction. Due to the compact construction of the unit both the path through the heat exchanger as well as the path through the bypass are only short in length so that there is no or only low pressure drop.

In accordance with an advantageous aspect of the unit according to the invention, each of the first and second valve bodies is mechanically connected to a common actuator. The common actuator is adapted to switch the first and second valve bodies from the recovery position to the bypass position and vice versa. This allows for a simple construction of the actuator, and by providing only one actuator and a mechanical connection of the actuator to both the first and second valve bodies it is ensured that both valve bodies are acted upon simultaneously in order to be switched from the recover position to the bypass position or vice versa. In addition, the common actuator is preferably force-controlled and comprises a position sensor capable of generating an actuator position signal enabling an on-board diagnostics to generate an alarm signal in case of a defect and/or malfunction of the valve. For example, once the OBD has determined from the actuator position signal that there must be a defect/malfunction of the valve, the OBD may generate an LED light signal indicating to the driver that there is a malfunction/defect of the thermal energy recovery unit.

In accordance with a further advantageous aspect of the unit according to the invention, the first valve body comprises a first valve flap and the second valve body comprises a second valve flap. The first valve flap is connected to a first axle and the second valve flap is connected to a second axle so that the first and second valve flaps are capable of being pivotally switched between the recovery position and the bypass position. Each of the first and second valve seats comprises a pair of frames which are arranged angularly spaced from one another. The frames have a size and shape such that the respective valve flap abuts against one of the frames of the respective pair of frames when the valve flap is in the recovery position and abuts against the other one of the frames of the pair of frames when the valve flap is in the bypass position.

The embodiments of the valve bodies comprising first and second valve flaps which are each connected to first and second axles, respectively, allow for an easy switching of the valve flaps from the recovery position to the bypass position and vice versa through pivoting of the first and second axles. Due to the first and second valve seats each comprising a pair of frames which are sized and shaped such that the first and second valve flaps abut against the respective frames, from a constructional point of view it can be easily ensured that either the bypass or the path through the heat exchanger is completely closed by the valve flaps. For this to be achieved, the valve flaps and frames must be dimensioned such that under any operating condition the respective valve flap securely abuts against the frames of the corresponding pair of frames of the associated valve seat. A further advantageous aspect of this construction is that it is possible to arrange the bearings for the axle outside the housing of the unit to prevent the bearings from being exposed to the very high temperatures of the exhaust gas.

In accordance with a further advantageous aspect of the unit according to the invention, the first valve flap comprises a first guiding plate attached to a first surface of the first valve flap. This first guiding plate is adapted to direct the flow of exhaust gas away from the first axle and towards the heat exchanger when the first valve flap is in the recovery position. The first valve flap further comprises a second guiding plate attached to a second surface of the first valve flap opposite to the first surface of the first valve flap. This second guiding plate is adapted to direct the flow of exhaust gas away from the first axle and towards the bypass when the first valve flap is in the bypass position. Correspondingly, the second valve flap comprises a third guiding plate attached to a first surface of the second valve flap. This third guiding plate is adapted to direct the flow of exhaust gas away from the second axle and towards the outlet when the second valve flap is in the recovery position. The second valve flap further comprises a fourth guiding plate attached to a second surface of the second valve flap opposite to the first surface of the second valve flap. This fourth guiding plate is adapted to direct the flow of exhaust gas away from the second axle and towards the outlet when the second valve flap is in the bypass position.

The guiding plates serve to smoothly guide the exhaust gas flow away from the axles either towards the heat exchanger (recovery position of the valve flaps) or towards the bypass (bypass position of the valve flaps) as regards the first valve flap, or towards the outlet as regards the second valve flap. Thus, the guiding plates protect the axles from being exposed to the exhaust gas flow, regardless of whether the valve flaps are in the recovery position or in the bypass position. The guiding plates are securely attached to first and second surfaces of the respective first and second valve flaps, for example they can be attached to the valve flaps by spot welding.

In accordance with a further aspect of the unit according to the invention, the common actuator comprises a linearly movable driving member which is coupled to the first and second axles of the first and second valve flaps by a mechanical link system, said mechanical link system being capable of translating a linear movement of the driving member into a pivotal movement of the first and second axles of the first and second valve flaps. This is a practical and easy embodiment of the actuator and its coupling to the axles with the aid of which the valve flaps can be pivoted from the recovery position to the bypass position and vice versa. For example, the driving member can either be the armature of a linear motor itself or can be coupled to the armature of a linear motor. If, for example, an axle or a valve flap is broken, applying the predetermined force to the armature of the linear motor to move the valve flaps either to the recovery position or to the bypass position may then result in that the armature of the linear motor (or a separate driving member attached to the armature) can be moved to a position which is beyond the end position to which it can be moved during normal operation of the unit, or may result in that the armature cannot be moved at all to the end position to which it can be moved during normal operation of the unit. Any of these cases can be determined with the aid of the position sensor which generates an actuator position signal indicative of the actual position of the armature (or the separated driving member attached to the armature), and this actuator position signal then enables the on-board diagnostics (OBD) to generate an alarm signal (e.g. an LED light signal) indicating to the driver that there is a malfunction/defect of the thermal energy recovery unit. In accordance with yet another aspect of the unit according to the invention, the heat exchanger is arranged relative to the first and second separate valve bodies and associated first and second valve seats in a manner such that with the valve bodies arranged in the recovery position the exhaust gas is directed to flow along a U-shaped path through the heat exchanger. This arrangement of the heat exchanger is particularly space-saving and keeps space consumption of the unit at a minimum.

In accordance with still another aspect of the unit according to the invention, the heat exchanger comprises an inlet for a working fluid, an outlet for the working fluid, and a stack of adjacent hollow exchanger elements fluidically arranged in parallel between the inlet and the outlet for the working fluid. The exchanger elements are arranged spaced from one another to define flow channels between the adjacent hollow exchanger elements for the exhaust gas to flow through. The heat exchanger further comprises a distribution manifold arranged between the inlet for the working fluid and the stack of exchanger elements as well as a collecting manifold arranged between the adjacent hollow exchanger elements and the outlet for the working fluid. Preferably, the heat exchanger is arranged to extend perpendicular to the direction of flow of the exhaust gas through the unit so that space consumption is kept at a minimum.

In accordance with a further aspect of the unit according to the invention a thermally insulating element is arranged between the heat exchanger and the bypass, so as to keep away from the heat exchanger any influence of the hot exhaust gas flowing through the bypass, thus thermally separating the bypass from the heat exchanger.

BRIEF DESCRIPTION OF FIGURES

Further advantageous aspects will become apparent from the following description of an embodiment of the unit according to the invention with the aid of the drawings in which.

In the following embodiments of the apparatus according to the invention are shown by means of the enclosed drawings, wherein.

DETAILED DESCRIPTION

Figure 1:
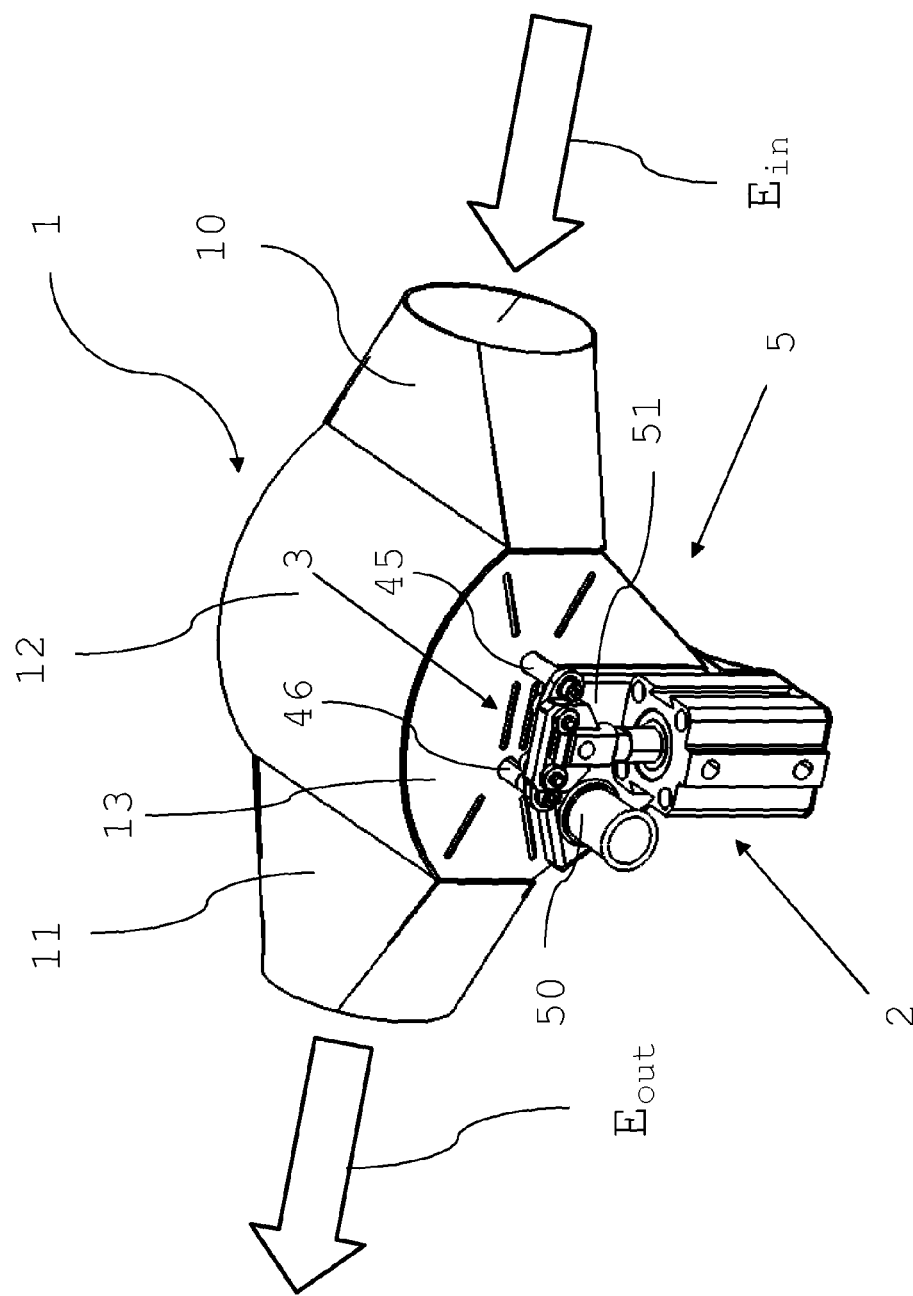
FIG. 1 is a perspective view of an embodiment of the unit according to the invention.
Figure 2:
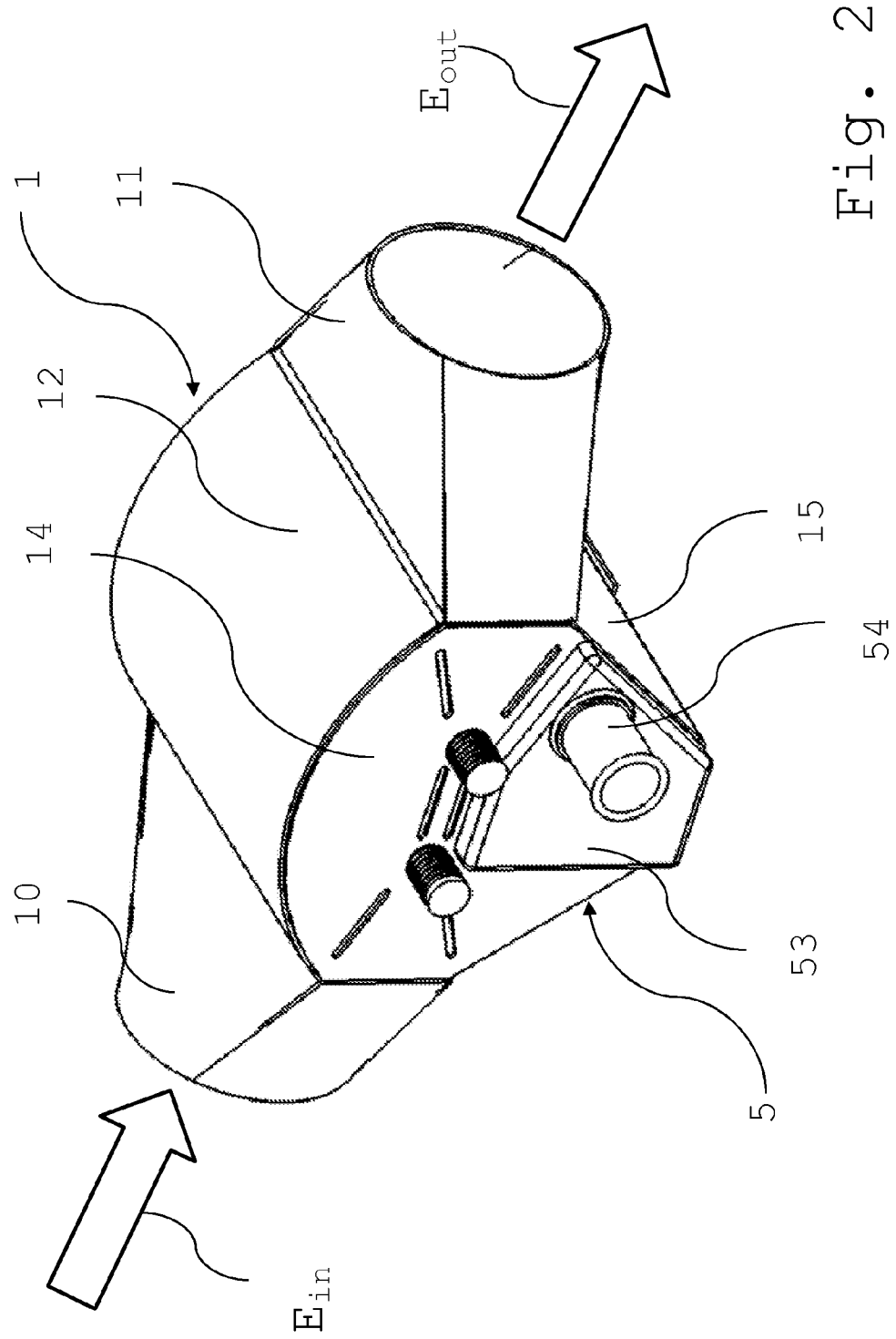
FIG. 2 is a perspective view from the opposite side of the unit of FIG. 1.

FIG. 1 and FIG. 2 are perspective views from opposite sides (front and rear views) of an embodiment of the unit according to the invention. As can be seen inflowing exhaust gas $E_{in}$ coming from an internal combustion engine or from a catalytic converter arranged downstream of the engine enters the unit through an inlet 10 of a housing 1 of the unit, flows through the unit, and then exits from the unit as outflowing exhaust gas $E_{out}$ through an outlet 11 of the housing. The housing 1 further comprises a top wall 12, two side walls 13 and 14, and a bottom 15. As can be seen from FIG. 1, an actuator 2 of the unit is coupled to a first axle 45 of a first valve flap 40 (see FIG. 3 or FIG. 4) and to a second axle 46 of a second valve flap 41 (see FIG. 3 or FIG. 4) with the aid of a mechanical link system 3. The unit further comprises a heat exchanger 5 the exchanger elements 52 of which (see FIG. 4) are arranged inside housing 1. An inlet 50 and a distribution manifold 51 of heat exchanger 5 are visible in FIG. 1 while a collecting manifold 53 and an outlet 54 of heat exchanger 5 are visible in FIG. 2.

Figure 3:
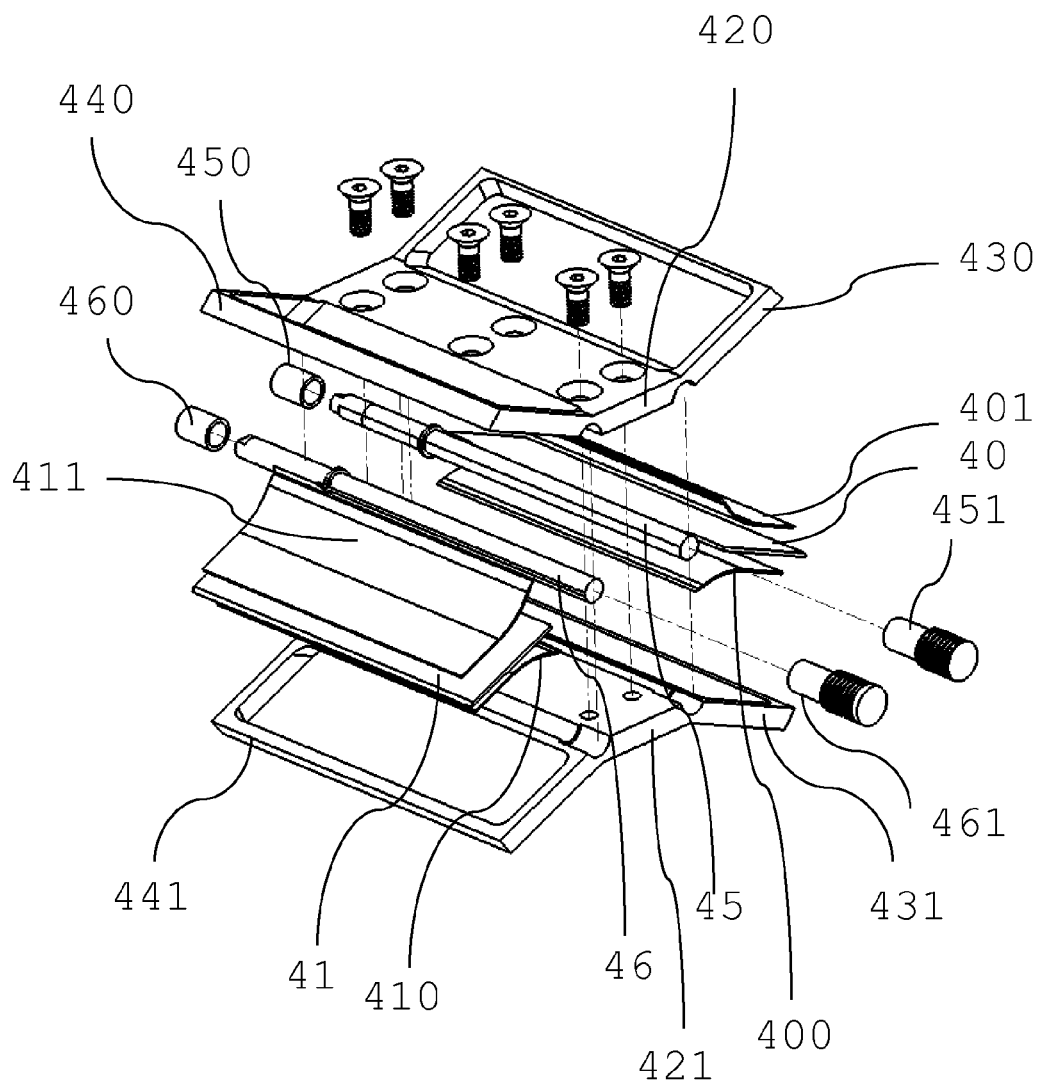
FIG. 3 is an exploded view showing the individual elements of the valve of the unit according to FIG. 1.
Figure 4:
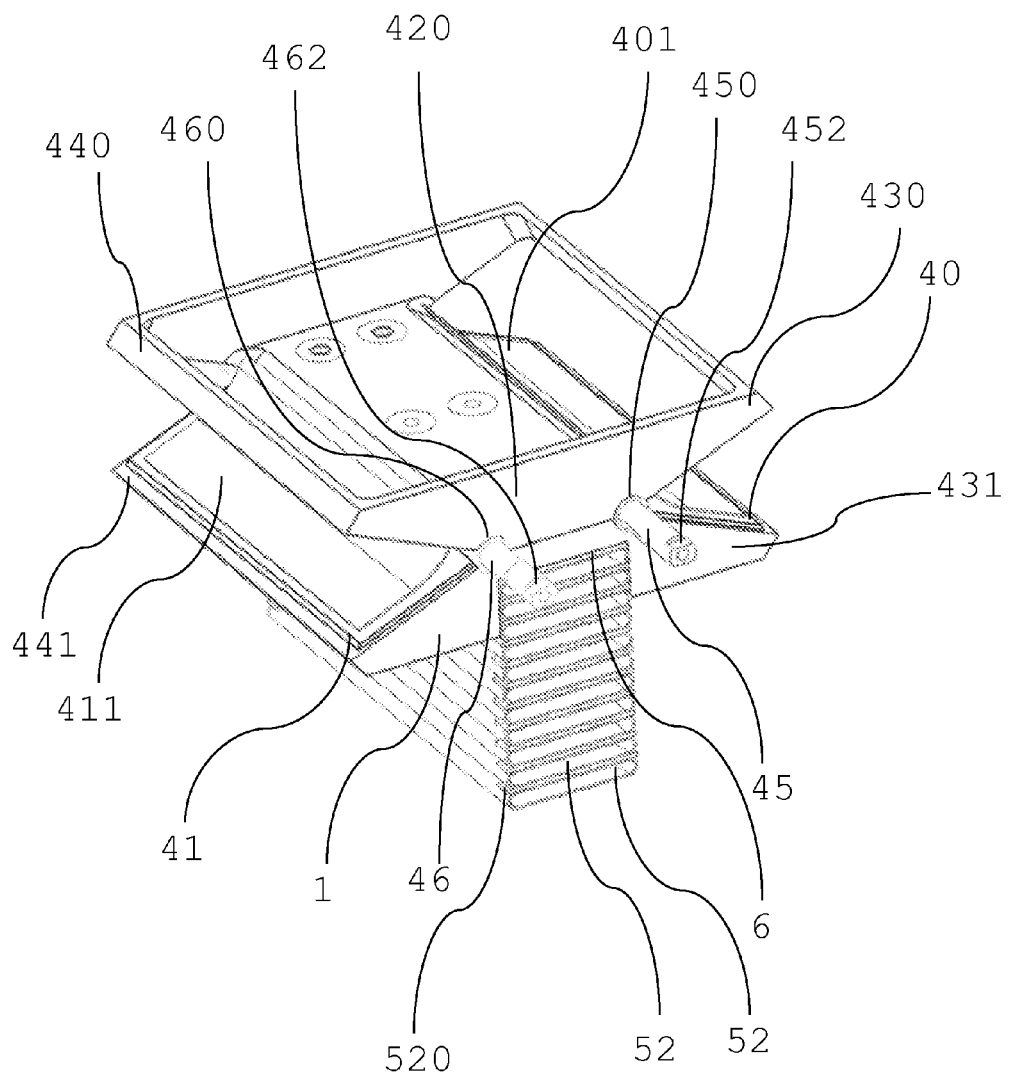
FIG. 4 is a perspective view of the first and second valve flaps and first and second valve seats together with the exchanger elements of the heat exchanger arranged therebeneath.

Referring now to FIG. 3 and FIG. 4, FIG. 3 shows an exploded view of the single elements of the valve of the unit of FIG. 1 and FIG. 2. FIG. 4 shows a perspective view of the first valve flap 40 and the second valve flap 41 and the associated first and second valve seats with a stack of exchanger elements 52 of the heat exchanger arranged therebeneath. The first and second valve seats each comprise a pair of frames against which the valve flaps 40 and 41 may abut. The first valve seat comprises an upper frame 430 and a lower frame 431, and the second valve seat comprises an upper frame 440 and a lower frame 441. In the embodiment shown, the upper frames 430 and 440 are formed by a common upper frame element 420 while the lower frames 431 and 441 are formed by a common lower frame element 421.

Figure 6:
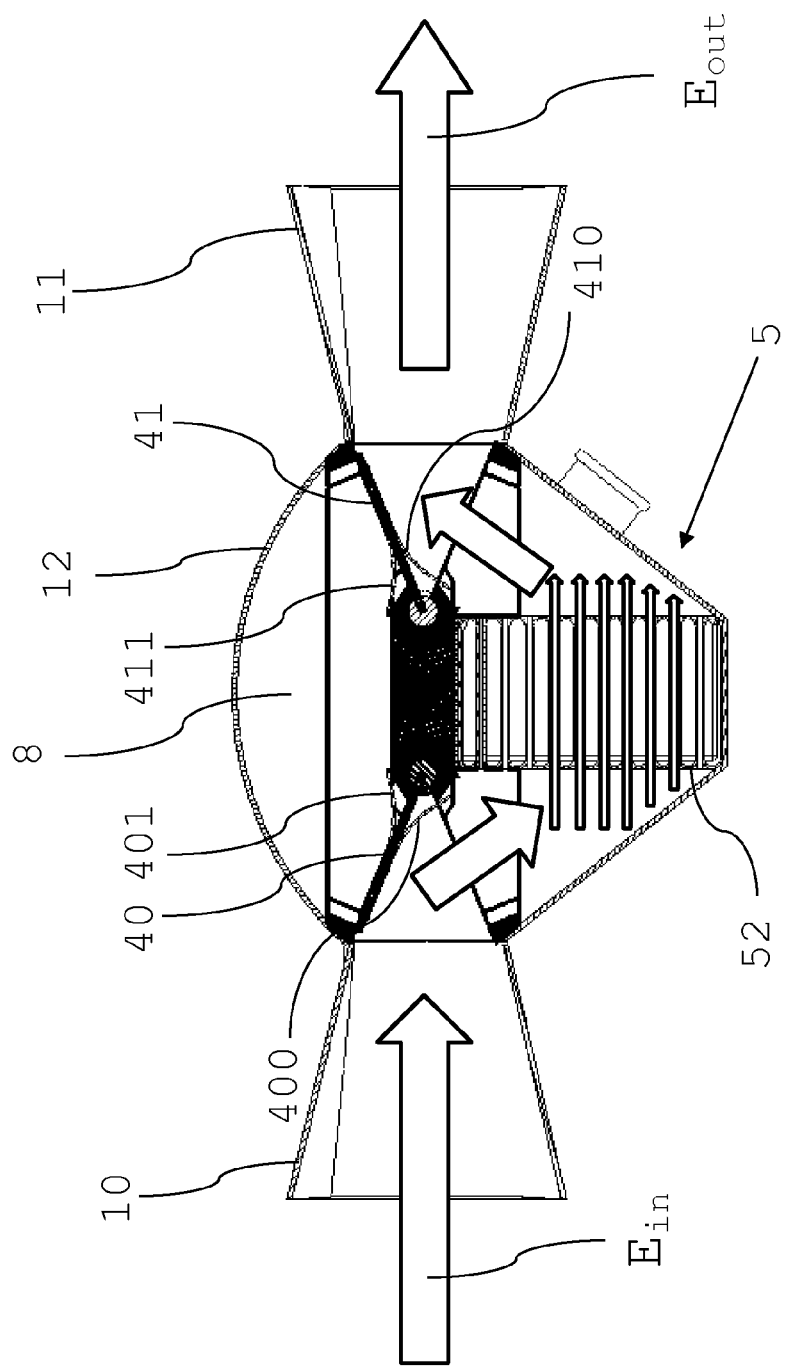
FIG. 6 is a sectional view of the unit according to FIG. 1 with the valve flaps in the recovery position.

First valve flap 40 is firmly connected to a first axle 45, for example first valve flap 40 may be fixedly arranged in a groove provided in first axle 45 (see FIG. 6). Similarly, second valve flap 41 is firmly connected to a second axle 46, for example second valve flap 41 may be fixedly arranged in a groove provided in second axle 46 (see FIG. 6). First axle 45 is supported by a first bearing 450 and a second bearing 451 whereas second axle 46 is supported by a third bearing 460 and a fourth bearing 461.

A first guiding plate 400 is attached to the lower surface of first valve flap 40 and a corresponding second guiding plate 401 is attached to the upper surface of first valve flap 40. Similarly, a third guiding plate 410 is attached to the lower surface of second valve flap 41 and a corresponding fourth guiding plate 411 is attached to the upper surface of second valve flap 41.

A stack of adjacent hollow exchanger elements 52 of heat exchanger 5 is arranged beneath lower frame element 421. The adjacent hollow exchanger elements 52 are stacked one above the other and are spaced from one another by spacers 520 (see FIG. 4) which are arranged between the respective adjacent hollow exchanger elements 52 to define flow channels between the adjacent hollow exchanger elements 52. In addition, a thermal insulating sheet 6 is arranged between lower frame element 421 and the uppermost hollow exchanger element 52 of heat exchanger 5.

Figure 5:
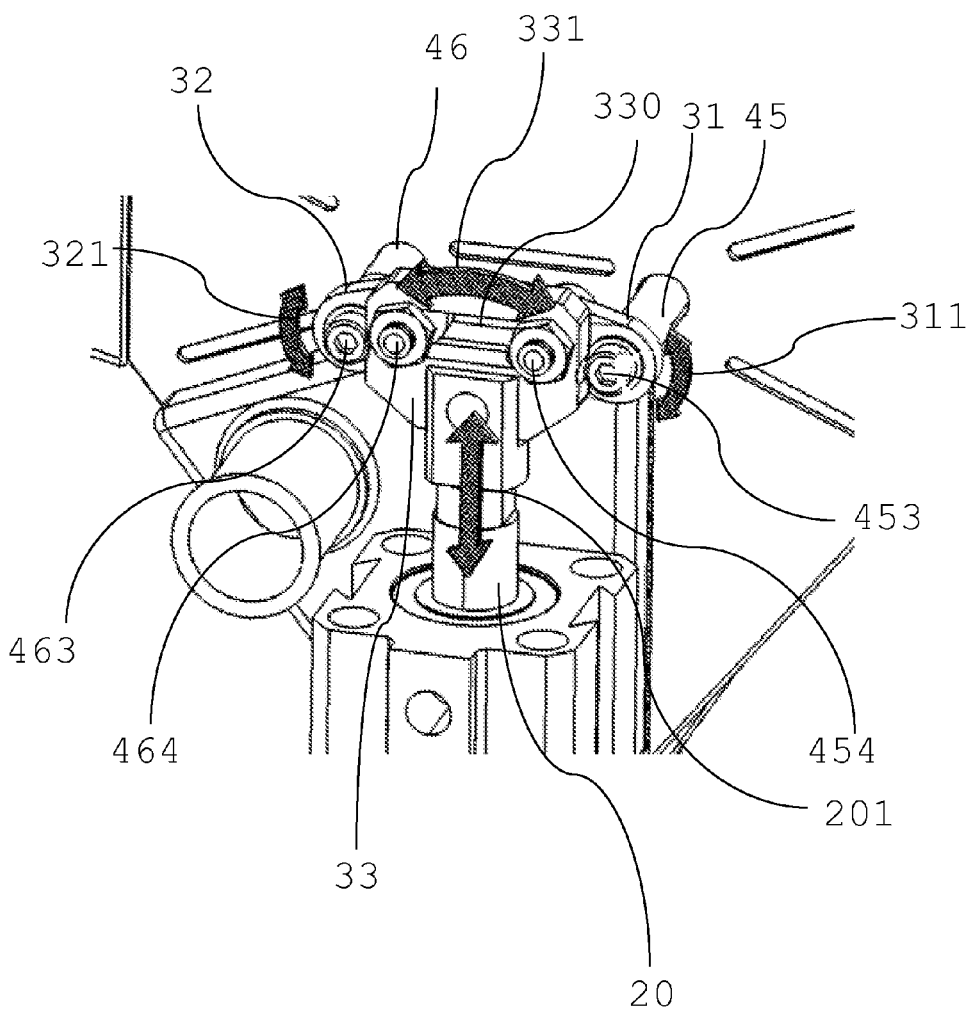
FIG. 5 is an enlarged view of an embodiment of the actuator.

FIG. 5 shows the actuator which is coupled by a mechanical link system to the first axle 45 to which first valve flap 40 is firmly connected, and to the second axle 46 to which second valve flap 41 is firmly connected. As can be seen from FIG. 5, the actuator comprises a linearly movable driving member 20 which is movable in the direction of the double arrow 201. One end of first axle 45 has a flattened end portion 452 (see FIG. 4) which is form-lockingly arranged in the opening of a first link element 31 and is secured to the said first link element 31 for example by means of a screw 453. Accordingly, first axle 45 cannot be rotated relative to first link element 31. Similarly, one end of second axle 46 has a flattened end portion 462 (see FIG. 4) which is form-lockingly arranged in the opening of a second link element 32 and is secured to the said second link element 32 for example by means of a screw 463. Accordingly second axle 46 cannot be rotated relative to second link element 32. First link element 31 is further connected to a third link element 33 which itself is fixedly attached to linearly movable driving member 20.

Also, second link element 32 is connected to third link element 33. Connection of first link element 31 and of second link element 32 to third link element 33 is achieved, for example, by means of two threaded bolts 454, 464 which are movably arranged in an elongated hole 330 provided in third link element 33. Accordingly, movement of the linearly movable driving member 20 in the direction of double arrow 201 results in first link 31 and second link 32 being rotated as shown by double arrow 311 and double arrow 321, respectively. For this to be possible, the bolts 454, 464 must be movable towards or away from each other in the elongated hole 330, as is indicated by double arrow 331. In the embodiment shown in FIG. 5, upward movement of the linearly movable driving member 20 results in the bolts 454 and 464 being moved away from each other and in a rotation of the first axle 45 and second axle 46 in the direction of the lower head of double arrows 311 and 321. Similarly, downward movement of the linearly movable driving member 20 results in the bolts 454 and 464 being moved towards each other and in a rotation of the first axle 45 and second axle 46 in the direction of the upper head of double arrows 311 and 321. Accordingly, by such movement of the linearly movable driving member 20 the first axle 45 and the second axle 46 can be rotated, as can the first valve flap 40 and the second valve flap 41 attached to them.

Figure 7:
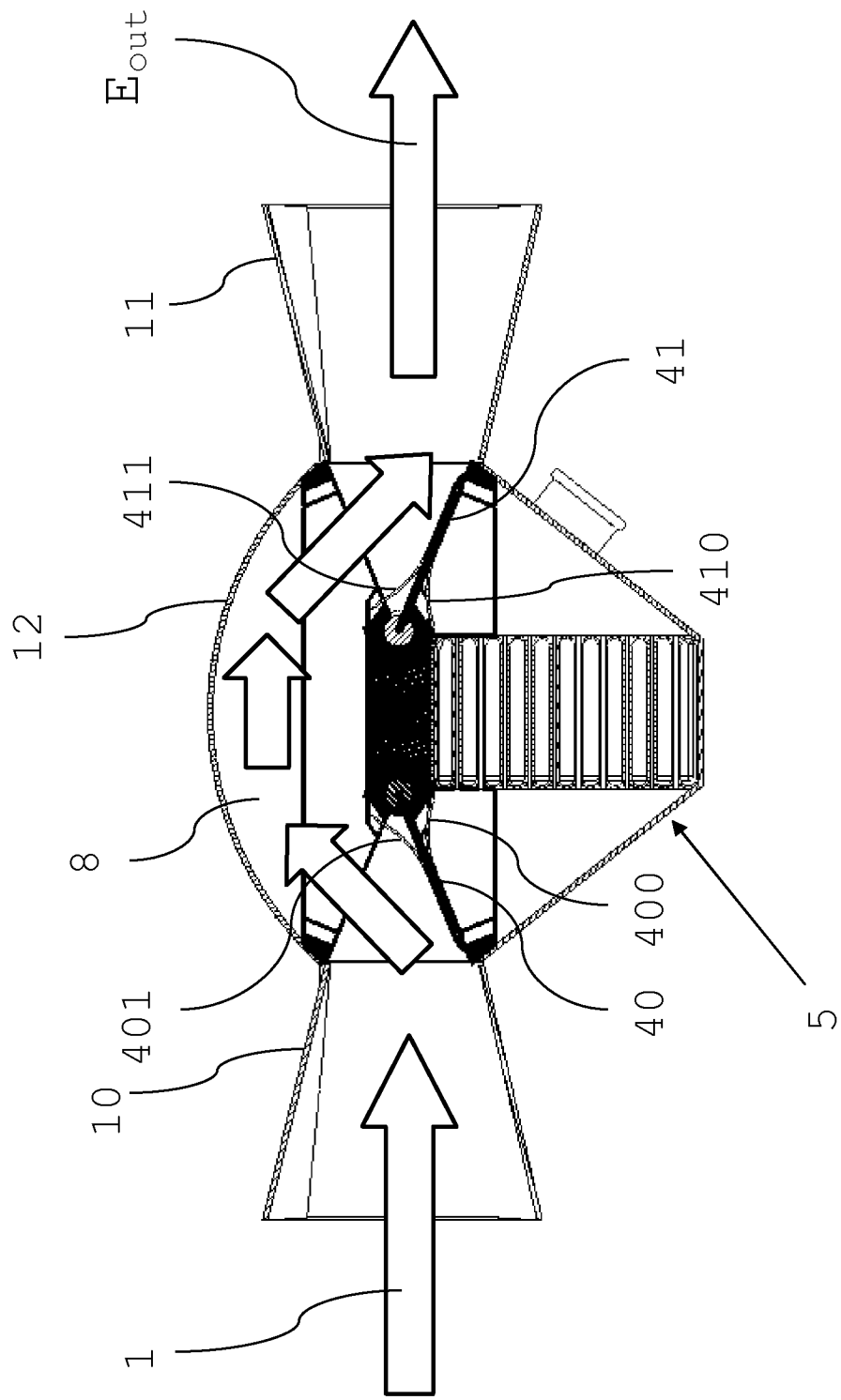
FIG. 7 is a sectional view of the unit according to FIG. 1 with the valve flaps in the bypass position.

Operation of the unit will now be described with reference to FIG. 6 and FIG. 7. Accordingly, FIG. 6 shows the unit with the first valve flap 40 and the second valve flap 41 in the recovery position so that the entire inflowing exhaust gas $E_{in}$ entering the unit through inlet 10 is directed to flow through the heat exchanger 5. After transfer of thermal energy to the working fluid flowing through the heat exchanger 5, the outflowing exhaust gas $E_{out}$ having a substantially lower temperature than that of the inflowing exhaust gas $E_{in}$ is directed to exit the unit through the outlet 11. In contrast thereto, FIG. 7 shows the unit with the first valve flap 40 and the second valve flap 41 in the bypass position so that the entire inflowing exhaust gas $E_{in}$ entering the unit through inlet 10 is directed to flow through the bypass 8, thus bypassing the heat exchanger 5. Accordingly, there is no transfer of thermal energy and the exhaust gas is directed to exit the unit as an outflowing exhaust gas $E_{out}$ having a temperature which is substantially the same as that of the inflowing exhaust gas $E_{in}$.

As the first valve flap 40 and the second valve flap 41 are in the recovery position (FIG. 6), the inflowing exhaust gas $E_{in}$ is smoothly diverted by first valve flap 40 and first guiding plate 400 attached thereto towards the heat exchanger 5 and flows through the flow channels between the stacked exchanger elements 52 of heat exchanger 5, as is indicated by the slim arrows between the hollow exchanger elements 52. A working fluid, for example the cooling water of the engine, is pumped through the inlet 50 of heat exchanger 5 (see FIG. 1) and is distributed by distribution manifold 51 to flow through the hollow exchanger elements 52. As the hot exhaust gas $E_{in}$ flows through the flow channels formed by the spaces between the exchanger elements 52, a substantial amount of the thermal energy carried by the exhaust gas $E_{in}$ is transferred to the working fluid flowing through the hollow exchanger elements 52 so that the temperature of the exhaust gas which has passed through the flow channels between the exchanger elements 52 is considerably lower than the temperature of the inflowing exhaust gas $E_{in}$. The exhaust gas has passed through the flow channels formed between the hollow exchanger elements 52 (i.e. after transfer of thermal energy from the exhaust gas to the working fluid) then flows towards the second valve flap 41 and is smoothly diverted by the second valve flap 41 and the fourth guiding plate 410 attached thereto to the outlet 11 to exit the unit as outflowing exhaust gas $E_{out}$.

As can be seen from FIG. 6 and FIG. 7, when the first valve flap 40 and the second valve flap 41 are in the recovery position, the entire exhaust gas $E_{in}$ entering the unit is directed through the heat exchanger 5. The bypass 8 is completely closed, and there is no possibility of backflow of the exhaust gas $E_{out}$ having the lower temperature to flow back through the bypass 8. Correspondingly, when the first valve flap 40 and the second valve flap 41 are in the bypass position, the entire exhaust gas $E_{in}$ entering the unit is directed through the bypass 8, so that there is no unwanted transfer of thermal energy to the working fluid (e.g. cooling water of the engine). The first, second, third and fourth guiding plates 400, 401, 410, 411 serve for smoothly diverting the direction of the exhaust gas to prevent the generation of backpressure. The first valve flap 40 and second valve flap 41 can be easily and quickly pivoted from the recovery position to the bypass position and vice versa with the aid of linearly movable driving member 20 and the link system comprising the links 31, 32, 33. Also, the first valve flap 40 and second valve flap 41 can only be switched simultaneously from the recovery position to the bypass position and vice versa. The linearly movable driving member 20 always move the first and second valve flaps to either of the two mentioned positions, so that once switched either the bypass 8 or the flow path through the heat exchanger is always closed.

An embodiment of the unit according to the invention has been described above. However, the invention is not limited to that embodiment, but rather various changes and modifications are conceivable without departing from the teaching underlying the instant invention. Accordingly, the scope of protection is only defined by the appended claims.

The invention claimed is:

1. A unit for recovering thermal energy from exhaust gas of an internal combustion engine, comprising:
    an inlet for the exhaust gas to enter the unit;
    an outlet for the exhaust gas to exit the unit;
    a heat exchanger in fluid communication with the inlet and the outlet, said heat exchanger being arranged downstream of the inlet and upstream of the outlet with respect to the flow of the exhaust gas through the unit; and
    a valve capable of being switched between a recovery position, in which the exhaust gas is directed to flow from the inlet through the heat exchanger to the outlet, and a bypass position, in which the exhaust gas is directed to flow from the inlet through a bypass to the outlet,
    wherein the valve comprises separate first and second valve bodies and associated separate first and second valve seats for receiving the separate first and second valve bodies in the recovery position and in the bypass position, wherein the first valve body and the associated first valve seat are arranged upstream of the heat exchanger and the bypass, respectively, with respect to the flow of the exhaust gas through the unit,
    wherein the second valve body and the associated second valve seat are arranged downstream of the heat exchanger and the bypass, respectively, wherein the first valve body comprises a first valve flap and the second valve body comprises a second valve flap, the first valve flap being connected to a first axle and the second valve flap being connected to a second axle so that the first and second valve flaps are capable of being pivotally switched between the recovery position and the bypass position, and wherein each of the first and second valve seats comprises a pair of frames which are arranged angularly spaced from one another, the frames having a size and shape such that the respective valve flap abuts against one of the frames of the respective pair of frames when the valve flap is in the recovery position and abuts against the other one of the frames of the pair of frames when the valve flap is in the bypass position; and wherein the first and second valve bodies are adapted to be switched only simultaneously from the recovery position to the bypass position and vice versa.

2. The unit according to claim 1, wherein each of the first and second valve flaps is mechanically connected to a common actuator, said common actuator being adapted to switch the first and second valve flaps from the recovery position to the bypass position and vice versa.

3. The unit according to claim 2, wherein the common actuator comprises a position sensor capable of generating an actuator position signal enabling an on-board diagnostics to generate an alarm signal in case of a defect and/or malfunction of the valve.

4. The unit according to claim 1, wherein the first valve flap comprises a first guiding plate attached to a first surface of the first valve flap, said first guiding plate being adapted to direct the flow of exhaust gas away from the first axle and towards the heat exchanger when the first valve flap is in the recovery position, wherein the first valve flap further comprises a second guiding plate attached to a second surface of the first valve flap opposite to the first surface of the first valve flap, said second guiding plate being adapted to direct the flow of exhaust gas away from the first axle and towards the bypass when the first valve flap is in the bypass position, wherein the second valve flap comprises a third guiding plate attached to a first surface of the second valve flap, said third guiding plate being adapted to direct the flow of exhaust gas away from the second axle and towards the outlet when the second valve flap is in the recovery position, and wherein the second valve flap further comprises a fourth guiding plate attached to a second surface of the second valve flap opposite to the first surface of the second valve flap, said fourth guiding plate being adapted to direct the flow of exhaust gas away from the second axle and towards the outlet when the second valve flap is in the bypass position.

5. The unit according to claim 1, wherein the common actuator comprises a linearly movable driving member which is coupled to the first and second axles of the first and second valve flaps by a mechanical link, said mechanical link translating a linear movement of the driving member into a pivotal movement of the first and second axles of the first and second valve flaps.

6. The unit according to claim 1, wherein the heat exchanger is arranged relative to the first and second separate valve flaps and associated first and second valve seats in a manner such that with the valve flaps arranged in the recovery position the exhaust gas is directed to flow along a U-shaped path through the heat exchanger.

7. The unit according to claim 6, wherein the heat exchanger comprises an inlet for a working fluid, an outlet for the working fluid, a stack of adjacent hollow exchanger elements fluidically arranged in parallel between the inlet and the outlet for the working fluid, said exchanger elements being arranged spaced from one another to define flow channels between the adjacent hollow exchanger elements for the exhaust gas to flow through, and a distribution manifold arranged between the inlet for the working fluid and the stack of exchanger elements as well as a collecting manifold arranged between the adjacent hollow exchanger elements and the outlet for the working fluid.

8. The unit according to claim 1, wherein a thermally insulating sheet is arranged between the heat exchanger and the bypass.

* * * * *